(12) United States Patent
Heindl et al.

(10) Patent No.: US 8,962,519 B2
(45) Date of Patent: Feb. 24, 2015

(54) PRECIPITATED SILICIC ACIDS FOR SUPPORT APPLICATIONS

(75) Inventors: Frank Heindl, Rodenbach (DE);
Claus-Peter Drexel, Neu-Isenburg (DE);
Frank Haselhuhn, Neuberg (DE)

(73) Assignee: Evonik Degussa GmbH, Essen (DE)

( * ) Notice: Subject to any disclaimer, the term of this patent is extended or adjusted under 35 U.S.C. 154(b) by 1061 days.

(21) Appl. No.: 13/056,725

(22) PCT Filed: Jul. 22, 2009

(86) PCT No.: PCT/EP2009/059431
§ 371 (c)(1),
(2), (4) Date: Jan. 31, 2011

(87) PCT Pub. No.: WO2010/012638
PCT Pub. Date: Feb. 4, 2010

(65) Prior Publication Data
US 2011/0136919 A1 Jun. 9, 2011

(30) Foreign Application Priority Data
Aug. 1, 2008 (DE) .................. 10 2008 035 867

(51) Int. Cl.
*B01J 20/00* (2006.01)
*C01B 33/12* (2006.01)
*C01B 33/18* (2006.01)
*B01J 20/10* (2006.01)
*C01B 33/193* (2006.01)

(52) U.S. Cl.
CPC ............ *C01B 33/18* (2013.01); *C01B 33/12* (2013.01); *B01J 20/103* (2013.01); *C01B 33/193* (2013.01)
USPC .......................... 502/407; 423/339

(58) Field of Classification Search
CPC ......... C01B 33/18; C01B 33/12; B01J 20/103
USPC .................. 423/335, 339; 502/400, 405, 407
See application file for complete search history.

(56) References Cited

U.S. PATENT DOCUMENTS

| 5,800,608 | A  | 9/1998 | Bomal et al. |
| 6,013,234 | A  | 1/2000 | Ray et al. |
| 6,335,396 | B1 | 1/2002 | Chevallier |
| 2005/0191228 | A1 | 9/2005 | Panz et al. |
| 2005/0192395 | A1 | 9/2005 | Panz et al. |
| 2006/0165581 | A1 | 7/2006 | Stenzel et al. |
| 2007/0100057 | A1 | 5/2007 | Stenzel et al. |

FOREIGN PATENT DOCUMENTS

| CN | 1927712 | 3/2007 |
| DE | 19807700 | 8/1999 |
| DE | 69825149 | 8/2005 |
| EP | 1357156 | 10/2003 |
| EP | 0966207 | 7/2004 |
| EP | 0984772 | 8/2004 |
| JP | 02-302312 | 12/1990 |
| JP | H07-223810 | 8/1995 |
| JP | 2000-507834 | 6/2000 |
| JP | 2006-265097 | 10/2006 |
| JP | 2007077012 | 3/2007 |
| RU | 2006106052 | 9/2007 |
| TW | 492846 | 7/2002 |
| TW | 200508151 | 4/2007 |
| TW | 200530128 | 3/2012 |
| TW | 200528396 | 8/2012 |
| WO | 2007036620 | 4/2007 |

OTHER PUBLICATIONS

PCT/EP2009/059431 International Preliminary Report on Patentability dated Feb. 8, 2011 (English Translation—9 pages).
PCT/EP2009/059431 International Search Report dated Nov. 18, 2009 (4 pages).
Taiwan Patent Office Action and Search Report for Application No. 098125548 dated Dec. 17, 2013 (8 pages—English Translation).
Japan Patent Office Action for Application No. 2011-520433 dated Sep. 17, 2013 (19 pages—Including English translation).
Chinese Patent Office Action for Application No. 200980130873.1 dated Jun. 19, 2013 (6 pages—Including English Translation).
Russian Patent Office Action for Application No. 2011107350 dated Mar. 24, 2014 (10 pages, English Translation included).
Taiwan Patent Office Action for Application No. 098125548 dated May 21, 2014 (3 pages—English Translation).

*Primary Examiner* — Anthony J Zimmer
(74) *Attorney, Agent, or Firm* — Michael Best & Friedrich LLP

(57) ABSTRACT

The present invention relates to novel precipitated silicic acids for use as support materials, manufacture thereof and use thereof.

7 Claims, No Drawings

PRECIPITATED SILICIC ACIDS FOR SUPPORT APPLICATIONS

CROSS-REFERENCE TO RELATED APPLICATIONS

This patent application is a national stage filing under 35 U.S.C. 371 of International Application No. PCT/EP2009/059431, filed Jul. 22, 2009, which claims the benefit of priority to German Patent Application No. 102008035867.3, filed Aug. 1, 2008, the disclosures of which are incorporated by reference herein in their entireties. Priority to each application is hereby claimed.

FIELD OF THE INVENTION

The present invention relates to novel precipitated silicas for use as a carrier material, and to the preparation and use thereof.

BACKGROUND

In many fields of use, for example in the field of products for crop protection, in the case of active pharmaceutical ingredients, in the case of production of animal feeds and animal feed additives or in the foods industry, carrier materials are used in order, for example, to convert liquid or resinous active ingredients to a free-flowing and storage-stable form. To produce the solid formulations, liquid or meltable substances are in some cases applied to carrier materials together with auxiliaries (for example surfactants and disintegrants). In the case of solid substances, the carrier materials serve primarily as a filler, whereas they absorb the liquid in the case of liquid or low-melting substances. This should afford easily manageable, outwardly dry absorbates, which are then marketed either as a powder directly (WP, wettable powder) or, in further-processed form, as granules/extrudates (WG, water dispersible granules).

A significant requirement on the carrier material is a sufficiently high absorptivity, such that a minimum amount of carrier material need be used. By means of conventional processes, it is possible to produce up to 65% absorbates (based on a liquid density of 1.00 g/ml) with sufficient flowability.

A further requirement in addition to the high loading of the carrier material with active ingredient is that the absorbates have a good flowability and a minimum level of dusting in the course of transport, transfer and the production of the absorbates. To improve the flowability, it has therefore been proposed, for example in EP 0984772 B1 and EP 0966207 B1, to use microgranular precipitated silicas in approximately spherical form and with a mean particle size of more than 150 µm as the carrier material. The absorbates obtained in this way do have an improved flowability. However, the processing properties are not optimal, since, in the course of production of absorbates, especially at high loading with liquid, caked material in the mixers and delivery systems is frequently observed with these precipitated silicas, and reduces the yield and the product quality and in some cases has to be removed in a costly and inconvenient manner.

There is therefore still a high demand for inexpensive carrier materials which have good processibility and allow absorbates with high loading and good flowability to be produced.

SUMMARY OF THE INVENTION

It was therefore an object of the present invention to provide novel precipitated silicas which do not have, or have only to a reduced degree, at least some of the disadvantages of the prior art carrier materials absorbates, and which allow production of novel absorbates with improved performance properties. In addition, a process for preparing the precipitated silicas and for producing the absorbates shall be provided.

It was a specific object to provide precipitated silicas which allow absorbates with very good flowability and good processibility to be produced.

This object and further objects which are not stated explicitly are achieved by the precipitated silica, absorbates and production processes defined in detail in the claims, the description and the examples.

DETAILED DESCRIPTION

It has been found that, surprisingly, it is not sufficient to use carrier materials with a spherical shape and a mean particle size for the production of absorbates. The inventors have found by means of detailed studies that one cause of caking in the mixer is the formation of fine particle fractions as a result of the mechanical stress on the carrier silicas in the course of absorbate production. It has additionally been found that harder precipitated silicas lead to less caking. It was possible through a specific preparation process of the inventive precipitated silicas to enhance the hardness of the silica particles to such a degree that they significantly better withstand the mechanical stress in the course of absorbate production and it was thus possible to significantly reduce dust formation in the course of absorbate production, but it is simultaneously ensured that the hardened precipitated silicas have a sufficiently high absorptivity. The inventive precipitated silicas are therefore notable for a high porosity—expressed by the DBP number—and better-stabilized pore walls. In other words, the increase in the mechanical stability was achieved and a high absorption capacity was obtained simultaneously.

The higher mechanical stability of the inventive silicas reduces the fines fraction in the mixing units. This in turn has the advantage that there is less caking in mixing units.

In a preferred embodiment, the inventive silicas have an approximately neutral pH, such that they can be used very universally as carriers and have no adverse effects on the storage stability of the absorbed liquids.

Moreover, the inventive silicas have, compared to commercially used carrier silicas, for example Tixosil 38 X from Rhodia Chimie or Hubersil 5170, an optimal relationship between hardness, i.e. mechanical stability, and absorptivity.

The present invention therefore provides precipitated silicas with
  a DBP absorption (anhydrous) of 210 to 270 g/100 g
  a $d_{50}$ after 1 min of ultrasound exposure of 220 to 400 µm
  a proportion of particles smaller than 200 µm after 1 min of ultrasound exposure of less than 35% by volume.

The present invention additionally provides a process for preparing the inventive precipitated silicas, comprising the steps of
  a) providing a precipitated silica with a mean particle size $d_{50}$ without ultrasound exposure of 230 to 600 µm and a moisture content of 2 to 70% by weight
  b) contacting the silica from step a) with at least one basic substance or at least one solution of at least one basic substance for 1 min to 72 h
  c) drying the precipitated silica obtained in step b).

The present invention further provides for the use of the inventive silicas as a carrier substance.

The present invention finally provides absorbates comprising at least one inventive silica.

The subject-matter of the present invention is described in detail hereinafter. In the context of the present invention, the terms "precipitated silica(s)" and "silica(s)" are used synonymously.

The inventive precipitated silicas are notable for
- a DBP absorption (anhydrous) of 210 to 270 g/100 g
- a $d_{50}$ after 1 min of ultrasound exposure of 220 to 400 µm
- a proportion of particles smaller than 200 µm after 1 min of ultrasound exposure of less than 35% by volume.

A sufficiently high DBP absorption ensures that the inventive precipitated silicas can be loaded with sufficient amounts of substance to be absorbed, and thus that one of the objects, specifically that of being able to produce absorbates with maximum loading with a minimum amount of carrier material, can be achieved. When the DBP is too high, i.e. the precipitated silica is too porous, it may occur that the mechanical stability can no longer be ensured and the result may be increased formation of fines in the course of production of the absorbates. The inventive precipitated silicas therefore preferably have a DBP absorption (anhydrous) of 220 to 265 g/100 g and more preferably of 225 to 260 g/100 g.

A further significant property of the inventive precipitated silicas is their hardness. The mechanical stresses resulting from the action of the mixing units on the precipitated silicas in the course of production of the absorbates are simulated by the action of ultrasound waves on the precipitated silica for 1 min. The inventive precipitated silicas are notable for a particularly high hardness, such that the mean particle size $d_{50}$ after 1 min of ultrasound at 25 W is in the range from 220 to 400 µm, preferably 240 to 380 µm, more preferably 260 to 360 µm and most preferably 270 to 350 µm. This particle size is important in order to ensure a sufficient flowability of the absorbates produced with the inventive precipitated silicas. This effect can be enhanced when it is ensured that the inventive precipitated silicas have a very substantially spherical shape. In a preferred embodiment, the inventive precipitated silicas therefore have an approximately spherical shape, an approximately spherical shape corresponding to the shape of the precipitated silicas that they typically have after a spray tower drying operation. Examples of precipitated silicas with an approximately spherical shape can be found in DE 198 07 700 A1, FIGS. 1 and 3 to 5, or U.S. Pat. No. 6,013,234, FIG. 1.

In addition to the mean particle size after ultrasound or mechanical stress, the hardness of the inventive precipitated silicas is such that the proportion of small particles, i.e. particles with a particle size less than 200 µm after 1 min of ultrasound exposure, is preferably less than 35% by volume, more preferably less than 32% by volume, even more preferably 1 to 30% by volume, particularly preferably 1 to 28% by volume and especially preferably 1 to 25% by volume. This achieves the effect that, even after mechanical stress, the formation of caking in the mixer during the production of the absorbates is very substantially to completely prevented. Moreover, this ensures that dust formation of the precipitated silica after transport or after production of the absorbates is reduced significantly.

In a further preferred embodiment of the present invention, the inventive precipitated silicas have a pH in the range from 5.5 to 9.5, preferably 5.5 to 9, more preferably 5.5 to 8.5, most preferably 6 to 8. This very substantially neutral pH of the precipitated silicas ensures a broad spectrum of application with regard to the liquids to be absorbed, since excessively strongly acidic or excessively strongly basic carrier materials can trigger or accelerate the decomposition or another kind of chemical conversion of the liquids to be absorbed.

The inventive precipitated silicas can be prepared by a process which comprises the following steps:
a) providing a precipitated silica with a mean particle size $d_{50}$ without ultrasound exposure of 230 to 600 µm and a moisture content of 2 to 70% by weight
b) contacting the precipitated silica from step a) with at least one basic substance or at least one solution of at least one basic substance for 1 min to 72 h, preferably at a temperature of 10 to 150° C.,
c) drying the base-treated precipitated silica.

The precipitated silicas used in step a) of the process according to the invention have a mean particle size $d_{50}$ of 230 to 600 µm, preferably 250 to 500 µm, more preferably 250 to 400 µm and most preferably 270 to 380 µm. This ensures that the precipitated silicas obtained at the end of the process have an optimal mean particle size.

In addition, the precipitated silicas used in step a) of the process according to the invention must have a moisture content of 2 to 70% by weight. Without being bound to a particular theory, the applicant is of the view that a high moisture content of the precipitated silicas used ensures that the base used in step b) can penetrate sufficiently deeply into the pores of the precipitated silicas and sufficient hardening can thus proceed. Too low a moisture content, in contrast, leads to insufficient hardening. The precipitated silicas initially charged in step a) of the process according to the invention therefore have a moisture content of 2 to 70% by weight.

Since essentially only the hardness of the precipitated silicas is to be altered in step b) of the process according to the invention, the precipitated silicas initially charged in step a) of the process according to the invention preferably have a DBP absorption (anhydrous) of 210 to 350 g/100 g, preferably 220 to 300 g/100 g, more preferably 230 to 280 g/100 g, even more preferably 230 to 270 and especially 240 to 260 g/100 g.

The precipitated silicas used in step a) of the process according to the invention have preferably been subjected beforehand to at least one drying step, but optionally also to a plurality of drying steps. In principle, it is possible here to use any known drying method, for example drying by means of a flow dryer, spray dryer, staged dryer, belt dryer, rotary tube dryer, flash dryer, spin-flash dryer or spray tower dryer. These drying variants include operation with an atomizer, a one- or two-substance nozzle or an integrated fluidized bed. In a preferred process, a spray tower drying operation was performed in at least one drying step. This can achieve the effect that the precipitated silicas used in step a) already have a spherical shape.

In step b) of the process according to the invention, the precipitated silica from step a) is contacted with at least one basic substance or at least one solution of at least one basic substance for 1 min to 72 h, preferably at a temperature of 10 to 150° C. Without being bound to a particular theory, the applicants are of the view that the treatment with at least one base results in partial dissolution and new formation of the inner pore walls of the precipitated silicas, which forms more stable walls. Depending on the base used and the pore structure of the precipitated silica used, the contact time may be 1 min to 72 h, preferably 1 min to h, more preferably 1 min to 24 h, even more preferably 1 min to 16 h and especially preferably less than 6 h. The temperature at which the precipitated silica is contacted with at least one basic medium, measured in the silica bed or the reaction layer according to the reactor, is preferably 10° C. to 150° C., more preferably 10° C. to 120° C., even more preferably 10° C. to 100° C., particularly preferably 10° C. to 80° C. and especially preferably 10° C. to 60° C.

The precipitated silica can be contacted with the basic medium at atmospheric pressure, reduced atmospheric pressure, or else at elevated pressure of 0.2 to 10 bar.

In a preferred variant, the hardened precipitated silica is neutralized in the course of drying in step c) by driving out the base by means of hot gases or under reduced pressure, or, in another preferred variant, neutralized before or after step c) by contacting with an acidifier.

The drying in step c) can be effected by means of all known particle-conserving drying methods, for example by means of flow dryers, staged dryers, belt dryers, rotary tube dryers. These drying variants include operation with an atomizer, a one- or two-substance nozzle or an integrated fluidized bed.

Moreover, in the case of use of gaseous bases, the drying in step c) can preferably be effected simultaneously with the driving-out of the gaseous base by means of hot dry air and/or hot dry gases.

It is possible to perform a hydrophobization of the inventive precipitated silicas, preferably with silanes, siloxanes, polysiloxanes or with waxes.

In a first preferred variant of the process according to the invention, the precipitated silica used in step a) has a water content of 2 to 70% by weight, preferably 2 to 50% by weight, more preferably 5 to 25% by weight, most preferably 10 to 20% by weight. The moisture content of the precipitated silica can either be achieved by drying the precipitate suspension so as to directly obtain a precipitated silica with the necessary moisture content, or by contacting a precipitated silica with a lower moisture content with water such that the desired moisture content is established. This contacting can be effected by all processes known to those skilled in the art.

In this process variant, it is additionally preferred that, in step b), a base which is gaseous at 23° C. and atmospheric pressure and is selected from the group consisting of gaseous alkylamines and ammonia is used. In this case, the precipitated silica is contacted with the gaseous base such that the pH of the precipitated silica after contacting with the gaseous base is within the range from 8 to 12, preferably 8 to 11, more preferably 8.5 to 11 and most preferably 9 to 11. The contacting can be effected by passing the gaseous base over the precipitated silica in a suitable reactor, for example rotary tube oven, or by introducing the gas and the precipitated silica into an autoclave.

In this embodiment, the contact time is 1 min to 72 h, preferably 1 min to 48 h, more preferably 1 min to 24 h, even more preferably 1 min to 16 h and especially preferably less than 6 h. The temperature at which the precipitated silica is contacted with at least one gaseous base is 10° C. to 150° C., preferably 10° C. to 120° C., more preferably 10° C. to 100° C., even more preferably 10° C. to 80° C. and especially preferably 10° C. to 60° C.

The precipitated silica can be contacted with the gaseous base at atmospheric pressure or else at elevated pressure of 0.2 to 10 bar.

The gaseous base used in this embodiment has the advantage that the base, after hardening has ended, can easily be removed again from the precipitated silica. Thus, in this embodiment, the drying in step c) is preferably effected by driving out the water and the base by means of at least one gas selected from the group consisting of air, steam, noble gases, or mixtures of the aforementioned gases and/or vapours. Preference is given to effecting the drying by means of steam or air, more preferably air. It is likewise possible to use vacuum dryers which do not need to use gases. The gas used to drive out the water and the base preferably has a temperature of greater than or equal to 20° C., more preferably 20° C. to 700° C., even more preferably 40° C. to 500° C. and particularly preferably 60° C. to 350° C. and very especially preferably 80° C. to 250° C.

In order to be able to completely drive out the base and thus to attain a pH of 5.5-8.0 during step c), it may be necessary in this embodiment to dry the precipitated silica in step c) down to a moisture content of less than 3% by weight. Since carrier silicas, however, may typically have a moisture content of 5 to 7% by weight, the moisture content can be adjusted correspondingly by adding water subsequently to the driving-out of the base.

The driving-out of the water and of the base by means of hot gases or under reduced pressure in step c) can be effected by means of a flow dryer, staged dryer, belt dryer, rotary tube dryer, fluidized bed dryer, drying cabinet, or in vacuum dryers.

To reduce the pH of the silica, alternatively to the driving-out of the base by means of hot gases during the drying in step c), at least one acidifier can be added between steps b) and c) or after step c), until a pH of the silica of 5.5 to 8.0 is established. Thereafter, the neutralized silica can be dried directly, or one or more washing steps may precede the drying.

The acidifiers used may be dilute or concentrated mineral acids, for example HCl, $HNO_3$, $H_3PO_4$, organic acids, for example acetic acid, formic acid or $CO_2$, in gaseous form or in solution.

When the acidification is effected after step c), a further drying step may be required. In this case, all known drying methods can likewise be effected, for example drying by means of a flow dryer, staged dryer, belt dryer, rotary tube dryer, drying cabinet, fluidized bed dryer, or by means of hot gases.

In a second preferred embodiment of the process according to the invention, the precipitated silica in step a) has a water content up to 70% by weight, preferably 2 to 70% by weight. The moisture content of the precipitated silica can either be achieved by drying the precipitate suspension so as to directly obtain a precipitated silica with the necessary moisture content, or by contacting a precipitated silica with a lower moisture content with water or a base solution such that the desired moisture content is established. This contacting can be effected by all processes known to those skilled in the art.

In this process variant, it is additionally preferred that the base used in step b) is a solution comprising at least one base, referred to hereinafter as base solution, or a solid base, and that the base is selected from the group consisting of alkali metal hydroxides, alkaline earth metal hydroxides, alkali metal oxides, alkaline earth metal oxides, ammonia, carbonates, bicarbonates, waterglasses and amines. The base solution is prepared by means of a suitable solvent. Suitable solvents are, for example, water, branched or unbranched, monohydric or polyhydric alcohols having 1 to 10 carbon atoms.

In this embodiment, the precipitated silica is contacted with the base or the base solution such that the pH of the precipitated silica after contacting with the base and/or the base solution is in the range from 8 to 12, preferably 8 to 11, more preferably 8.5 to 11 and most preferably 9 to 11. The contacting can be effected by spraying the base solution onto the precipitated silica, by adding the base solution dropwise to the precipitated silica, or by stirring or mixing the precipitated silica into the base solution, or by preparing a suspension or dispersion of the precipitated silica in the base solution.

In this embodiment, the contact time is 1 min to 72 h, preferably 1 min to 48 h, more preferably 1 min to 24 h, even more preferably 1 min to 16 h and especially preferably less than 6 h. The temperature at which the precipitated silica is contacted with at least one base, measured in the silica bed or the reaction layer according to the reactor, is temperature of is 10° C. to 150° C., preferably 10° C. to 120° C., more preferably 10° C. to 100° C., even more preferably 10° C. to 80° C. and especially preferably 10° C. to 60° C.

The precipitated silica can be contacted with the gaseous base at atmospheric pressure or else at elevated pressure of 0.2 to 10 bar.

The base solution used in this embodiment can be handled more readily than the gaseous base in the first preferred embodiment and thus has the advantage of a lower level of apparatus complexity.

In this embodiment, the drying in step c) can be effected by means of all known particle-conserving drying methods, for example by means of a flow dryer, staged dryer, belt dryer, rotary tube dryer, or vacuum dryers. These drying variants include operation with an atomizer, a one- or two-substance nozzle or an integrated fluidized bed.

In order to obtain, in this case, a hardened precipitated silica with a pH of 5.5 to 8, it is possible between steps b) and c) or after step c) the pH of the precipitated silica to pH 5.5 to 8.0 by contacting with an acidifier. Thereafter, the neutralized silica can be dried directly, or the drying may be preceded by one or more washing steps.

The acidifiers used may be dilute or concentrated mineral acids, for example HCl, $HNO_3$, $H_3PO_4$, organic acids, for example acetic acid, formic acid, or $CO_2$ in gaseous form or in solution.

When the acidification is effected after step c), a further drying step may be required. This additional drying can be effected by means of all known particle-conserving drying methods, for example by means of a flow dryer, staged dryer, belt dryer or rotary tube dryer. These drying variants include operation with an atomizer, a one- or two-substance nozzle or an integrated fluidized bed.

The inventive precipitated silicas can be used to produce absorbates, the substances absorbed preferably being hardeners or initiators, crosslinkers, catalysts, pharmaceutical active ingredients and auxiliaries, cosmetic active ingredients and auxiliaries, cosmetic active ingredients and auxiliaries, cleaning and/or care agents, flavourings, aromas and fragrances, animal feeds or animal feed additives, for example amino acids, vitamins, minerals, foods or food additives, dyes and/or pigments, amino acids, oxidizing or bleaching agents, additives with microbicidal, especially fungicidal or bactericidal action, chemicals for agriculture and forestry and/or a concrete additive. The material absorbed on the carrier may be a liquid, an oil, a resin, a solution, a dispersion, a suspension or a melt.

Absorbates in the sector of animal feeds and animal feed additives include, for example, vitamins, minerals, amino acids and aromas. These are more preferably formic acid, propionic acid, lactic acid, phosphoric acid, choline chloride solution, vitamin E acetate and plant extracts, for example tagetes extract.

Absorbates in the sector of agriculture and forestry include, for example, absorbed fertilizers, for example nitrate- and/or phosphate-containing fertilizers, crop protection compositions, pesticides, for example herbicides, fungicides, insecticides.

Absorbates in the sector of cosmetic products include, for example, oils such as essential oils, perfume oils, care oils, fragrance oils and silicone oils, active antibacterial, antiviral or fungicidal ingredients; disinfectant and antimicrobial substances; deodorants; antioxidants; biologically active substances and biogenic active ingredients; vitamins and vitamin complexes; enzymes and enzymatic systems such as amylases, cellulases, lipases and proteases; cosmetically active substances such as ingredients of cosmetics and personal hygiene products; washing- and cleaning-active substances such as surfactants of all kinds, washing- and/or cleaning-active inorganic and organic acids, soil-repellent and soil-release active ingredients, oxidants and bleaches, bleach activators, builders and cobuilders, antiredeposition additives, greying and discolouration inhibitors, active substances for colour protection, substances and additives for laundry care, optical brighteners, foam inhibitors, pH modifiers and pH buffer substances.

Absorbates in the sector of foods and food additives include, for example, absorbed aromas, food supplements, vitamins, minerals, amino acids.

Absorbates from active pharmaceutical ingredients include all kinds of active pharmaceutical ingredients, for example α-proteinase inhibitor, abacavir, abciximab, acarbose, acetylsalicylic acid, acyclovir, adenosine, albuterol, aldesleukin, alendronate, alfuzosin, alosetron, alprazolam, alteplase, ambroxol, amifostine, amiodarone, amisulpride, amlodipine, amoxycillin, amphetamine, amphotericin, ampicillin, amprenavir, anagrelide, anastrozole, ancrod, antihaemophilic factor, aprotinin, atenolol, atorvastatin, atropine, azelastine, azithromycin, azulene, barnidipine, beclomethasone, benazepril, benserazide, beraprost, betamethasone, betaxolol, bezafibrate, bicalutamide, bisabolol, bisoprolol, botulin toxin, brimonidine, bromazepam, bromocriptine, budesonide, bupivacaine, bupropion, buspirone, butorphanol, cabergoline, calcipotriene, calcitonin, calcitriol, camphor, candesartan, candesartan cilexetil, captopril, carbamazepine, carbidopa, carboplatin, carvedilol, cefaclor, cefadroxil, cefaxitin, cefazolin, cefdinir, cefepime, cefixime, cefinetazole, cefoperazone, cefotiam, cefoxopran, cefpodoxime, cefprozil, ceftazidime, ceftibuten, ceftriaxone, cefuroxime, celecoxib, celiprolol, cephalexin, cerivastatin, cetirizine, chloramphenicol, cilastatin, cilazapril, cimetidine, ciprofibrate, ciprofloxacin, cisapride, cisplatin, citalopram, clarithromycin, clavulanic acid, clindamycin, clomipramine, clonazepam, clonidine, clopidogrel, clotrimazole, clozapine, cromolyn, cyclophosphamide, cyclosporin, cyproterone, dalteparin, deferoxamine, desogestrel, dextroamphetamine, diazepam, diclofenac, didanosine, digitoxin, digoxin, dihydroergotamine, diltiazem, diphtheria protein, diphtheria toxoid, divalproex, dobutamine, docetaxel, dolasetron, donepezil, dornase-α, dorzolamide, doxazosin, doxifluridine, doxorubicin, dydrogesterone, ecabet, efavirenz, enalapril, enoxaparin, eperisone, epinastine, epirubicin, eptifibatide, erythropoietin-α, erythropoietin-β, etanercept, ethynyloestradiol, etodolac, etoposide, factor VIII, famciclovir, famotidine, faropenem, felodipine, fenofibrate, fenoldopam, fentanyl, fexofenadine, filgrastim, finasteride, flomoxef, fluconazole, fludarabine, flunisolide, flunitrazepam, fluoxetine, flutamide, fluticasone, fluvastatin, fluvoxamine, follitropin-α, follitropin-β, formoterol, fosinopril, furosemide, gabapentin, gadodiamide, ganciclovir, gatifloxacin, gemcitabine, gestodene, glatiramer, glibenclamide, glimepiride, glipizide, glyburide, goserelin, granisetron, griseofulvin, hepatitis B antigen, hyaluronic acid, hycosin, hydrochlorothiazide, hydrocodone, hydrocortisone, hydromorphone, hydroxychloroquine, hylan G-F 20, ibuprofen, ifosfamide, imidapril, imiglucerase, imipenem, immunoglobulin, indinavir, indomethacin, infliximab, insulin, insulin human, insulin lispro, insulin aspart, interferon-β, interferon-α, iodine-125, iodixanol, iohexyl, iomeprol, iopromide, iopromide, ioversol, ioxoprolene, ipratropium, ipriflavone, irbesartan, irinotecan, isosorbide, isotretinoin, isradipine, itraconazole, potassium chlorazepate, potassium chloride, ketorolac, ketotifen, whooping cough vaccine, clotting factor IX, lamivudine, lamotrigine, lansoprazole, latanoprost, leflunomide, lenograstim, letrozole, leuprolide, levodopa, levofloxacin, levonorgestrel, levothyroxine, lidocaine, linezolide, lisinopril, lopamidol, loracarbef, loratadine, lorazepam, losartan, lovastatin, lysine acetylsalicylic acid, manidipine, mecobalamin, medroxyprogesterone, megestrol, meloxicam, menatetrenone, meningococcus vaccine, menotropin, meropenem, mesalamine, metaxalone, metformin, methylphenidate, methylprednisolone, metoprolol, midazolam, milrinone, minocycline, mirtazapine, misoprostol, mitoxantrone, moclobemide, modafinil, mometasone, montelukast, morniflumate, morphium, moxifloxacin, mycophenolate, nabumetone, nadroparin, naproxen, naratriptan, nefazodone, nelfinavir, nevirapine, niacin, nicardipine, nicergoline, nifedipine, nilutamide, nilvadipine, nimodipine, nitroglycerin, nizatidine, norethindrone, norfloxacin, octreotide, olanzapine, omeprazole, ondansetron, orlistat, oseltamivir, oestradiol, oestrogens, oxaliplatin, oxaprozin, oxolinic acid, oxybutynin, paclitaxel, palivizumab, pamidronate, pancrelipase, panipenem, pantoprazole, pantoprazole, paracetamol, paroxetine, pentoxifylline, pergolide, phenyloin, pioglitazone, piperacillin, piroxicam, pramipexole, pravastatin, prazosin, probucol, progesterone, propafenone, propofol, propoxyphene, prostaglandin, quetiapin, quinapril, rabeprazole, raloxifene, ramipril, ranitidine, repaglinide, reserpine, ribavirin, riluzole, risperidone, ritonavir, rituximab, rivastigmin, rizatriptan, rofecoxib, ropinirole, rosiglitazone, salmeterol, saquinavir, sargramostim, serrapeptase, sertraline, sevelamer, sibutramine, sildenafil, simvastatin, somatropin, somatropin, sotalol, spironolactone, stavudine, sulbactam, sulfaethidole, sulfamethoxazole, sulfasalazine, sulpiride, sumatriptan, tacrolimus, tamoxifen, tamsulosin, tazobactam, teicoplanin, temocapril, temozolomide, tenecteplase, tenoxicam, teprenone, terazosin, terbinafine, terbutaline, tetanus toxoid, tetrabenazine, tetrazapam, thymol, tiagabine, tibolone, ticarcillin, ticlopidine, timolol, tirofiban, tizanidine, tobramycin, tocopheryl nicotinate, tolterodin, topiramate, topotecan, torasemide, tramadol, trandolapril, trastuzumab, triamcinolone, triazolam, trimebutine, trimethoprim, troglitazone, tropisetron, tulobuterol, unoprostone, urofollitropin, valacyclovir, valproic acid, valsartan, vancomycin, venlafaxine, verapamil, verteporfin, vigabatrin, vinorelbine, vinpocetine, voglibose, warfarin, zafirlukast, zaleplon, zanamivir, zidovudine, zolmitriptan, zolpidem, zopiclone and derivatives thereof. However, active pharmaceutical ingredients are also to be understood to mean other substances such as vitamins, provitamins, essential fatty acids, extracts of vegetable and animal origin, oils of vegetable and animal origin, vegetable medicament preparations and homeopathic preparations.

The inventive precipitated silicas or silicates can especially be used as a carrier for animal feed additives, for example formic acid, propionic acid, lactic acid, phosphoric acid, choline chloride solution, vitamin E acetate or plant extracts, for example tagetes extract.

In addition, the inventive precipitated silicas can be used as a carrier material for chemical intermediates such as melamine resins or paint additives.

To produce the absorbates, the inventive precipitated silicas are contacted with at least one substance to be absorbed, such that the substance can penetrate into the pores of the precipitated silica. To this end, all technologies known to those skilled in the art, for example mixing or fluidized bed methods, are employable. Preference is given to initially charging the precipitated silica in a solid mixing unit, for example kneader, paddle dryer, tumbling mixer, vertical mixer, paddle mixer, Schugi mixer, cement mixer, Gericke continuous mixer, Eirich mixer and/or silo mixer. The process parameters are selected accordingly depending on the type and composition of the substance to be absorbed, the apparatus features and the process requirements. Corresponding techniques and processes are sufficiently well known to those skilled in the art.

The content of absorbed substance in the absorbates is between 5 ml/100 g of silica and 230 ml/100 g of silica.

The reaction conditions and the physicochemical data of the inventive precipitated silicas are determined by the following methods:

Determination of the DBP Absorption

The DBP absorption (DBP number), which is a measure of the absorptivity of the precipitated silica, is determined on the basis of the standard DIN 53601 as follows:

The moisture content of the silica used for the DBP absorption should be 4-8% by weight. If necessary, this can be established by drying or moistening with water. Any drying necessary can be accomplished at 105° C. The moistening of the sample can be obtained, for example, by the conditioning of a silica spread out in a thin layer in a climate-controlled cabinet. Direct moistening with liquid water should be avoided, since this would inevitably lead to an inhomogeneous distribution of the liquid.

12.50 g of pulverulent or pelletized silica of moisture content 4-8% by weight are introduced into the kneader chamber of the absorptometer (absorptometer C from Brabender with steel chamber (Art. No. 1.2316) or absorptometer from Hitec (model DABS) with steel chamber (Art. No. 1597)). With constant mixing (peripheral speed of the kneader paddles 125 rpm), the Dosimat (absorptometer C: Schott Titronic universal burette, nominal volume 50 ml, or Hitec absorptometer: Schott Titronic universal burette, nominal volume 50 ml) is used to add Vestinol C (dibutyl phthalate) dropwise to the mixture at a rate of 4 ml/min at room temperature. The mixing is effected at low torque. The torque is plotted on the monitor of the control PC. Towards the end of the determination, the mixture becomes pasty, which causes a steep rise in the torque. When 600 digits are displayed (torque of 0.6 Nm), an electrical contact switches off both the kneader and the DBP dosage. The synchronous motor for the DBP feed is coupled to a digital counter, such that the consumption of DBP in ml can be read off.

The DBP absorption is reported in g/(100 g) and is calculated by the following formula:

$$DBP = \frac{V*D*100}{E} * \frac{g}{100\ g} + K$$

where
DBP=DBP absorption in g/(100 g)
V=consumption of DBP in ml
D=density of DBP in g/ml (1.047 g/ml at 20° C.)
E=starting weight of silica in g
K=correction value according to moisture correction table in g/(100 g)

The DBP absorption is defined for the anhydrous, dried silica. In the case of use of moist precipitated silicas, the correction value K should be taken into account for the calculation of DBP absorption. This value can be determined using the correction table which follows. For example, a water content of the silica of 5.8% would mean an additional contribution of g/(100 g) for the DBP absorption. The moisture content of the silica is determined by the method "Determination of the moisture content and of the drying loss".

TABLE 1

Moisture content correction table for dibutyl phthalate absorption (anhydrous)

| % Moisture content | .% Moisture content | | | | |
|---|---|---|---|---|---|
| | .0 | .2 | .4 | .6 | .8 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |

Determination of the Particle Size by Means of Laser Diffraction

The application of laser diffraction to determine particle sizes is based on the phenomenon that particles diffract monochromatic light with a different intensity pattern. This diffraction depends on the particle size. The smaller the particles, the greater the diffraction angles.

Determination of the $d_{50}$ without Ultrasound Exposure and of the $d_{50}$ after 1 min of Ultrasound Exposure In the case of hydrophilic (water-wettable) precipitated silicas, the sample preparation and measurement (rinsing of the module, etc) are effected with the aid of a dispersion fluid (0.05% by mass of tetrasodium diphosphate in demineralized water). In the case of hydrophobic (non-water-wettable) precipitated silicas, this is done with an ethanol/water mixture (volume ratio 1:1).

Before the start of the measurement, the laser diffraction instrument LS 230 (from Beckman Coulter, Art. No. 6605210) with the liquid modulus (Small Volume Module Plus, 120 ml, from Beckman Coulter with internal US finger (diameter 6 mm), Art. No. 6605506) including a Sonics Vibracell US processor (model VCX 130) is allowed to warm up for 2 h, and the module is rinsed three times with the dispersion fluid and calibrated. In the case of hydrophobic precipitated silicas, rinsing is effected three times with the ethanol/water mixture.

In the menu bar of the instrument software (e.g. Version 3.29), via the menu point "analysis", the file window "calculate opt. model" is selected and the refractive indices are defined in an .rfd file: liquid refractive index B. I. real=1.332 (1.359 for ethanol); material refractive index real=1.46; imaginary=0.1; form factor 1. the menu window "sample info" and the sample names are defined. In addition, the file name for saving the analysis and the dispersion fluid are defined and confirmed with "OK". In the menu bar, the menu window "measurement cycle" is now selected. In this window, after confirming "new sample", the following settings are defined or activated:

"Offset measurement", "adjust", "background measurement", "set sample concentration", "input sample info" (serves to check the sample declared in the sample info), "start 1 measurement", and deactivate the PIDS function. In addition, in the "input measurement info" selection, the measurement time of 60 seconds is defined. In addition, the optical model "Fraunhofer.rfd" is selected here, and "size distribution" (check "during the measurement") and "save data" are activated. The pump speed is set to 75% on the measuring instrument (or on the Small Volume Module).

By means of a spatula, the silica sample, i.e. the unscreened original material, is added until a measurement concentration of 8 to 12% is attained and the instrument reports "OK". This is then followed by further dispersion for 60 seconds by pumped circulation without ultrasound exposure. The activation of the "start" menu selection undertakes the measurement at room temperature and determines the $d_{50}$ value without ultrasound treatment. Subsequently, the dispersion is exposed to 25 watts for 60 seconds, unpulsed, by means of the internal ultrasound finger in the SVM module and analyzed again, which gives the $d_{50}$ after 1 min of ultrasound treatment. The $d_{50}$ values are each determined from the raw data curves by means of the instrument software on the basis of the volume distribution and the optical model parameters (Fraunhofer.rfd file). The $d_{50}$ values are the median values.

Determination of the Proportion of Particles <200 μm after 1 min of Ultrasound Exposure The proportion of particles <200 μm after ultrasound exposure in % is determined graphically from the cumulative volume distribution curve obtained from the particle size determination described for the determination of the $d_{50}$ value after 1 min of ultrasound exposure by means of laser diffraction (Coulter LS 230).

Determination of the Drying Loss (of the Moisture Content)

The moisture content of silicas is determined to ISO 787-2 at 105° C. in a forced-air drying cabinet after drying for 2 hours. This drying loss consists predominantly of water moisture.

Determination of the pH of the Finished Hardened Precipitated Silica

The solid starting weights of all pH measurements are based on dried material. When undried original material is used, the drying loss (moisture content) thereof has to be determined. The starting weights for the pH determination are subsequently corrected with the value of the drying loss.

The pH of the silica is determined in 5% aqueous suspension at room temperature based on DIN EN ISO 787-9. Contrary to the stipulations of this standard, a starting weight of 5.00 g of silica in 95 ml of deionized water is selected.

The examples which follow are intended to further illustrate the invention without restricting its scope.

General Description of the Test Performance of the Hardening of the Precipitated Silicas:

25 g of precipitated silica were added in a closable glass bottle with a volume of 250 μl to 48.5 ml of 0.1 n NaOH$_{aqueous}$ and stirred by hand 1 by means of a spatula for 1 min. Thereafter, the bottle was closed and stored at room temperature (approx. 23° C.) for 15 min.

Thereafter, the contents of the screw top bottle were spread out uniform layer thickness on a preheated glass dish (diameter 30 cm) and dried in a drying cabinet preheated to 175° C. for 15 min. The dried and hardened precipitated silica was then spread out in a uniform layer thickness in a glass dish (diameter 30 cm) and conditioned in a climate-controlled cabinet at 23° C. and 50% relative room humidity for 30 min. The pH of the dried and conditioned sample was 8.6.

Example 1

The starting silica used was Sipernat® 2200 from Evonik Degussa GmbH with a mean particle size $d_{50}$ of 358 μm and a water content (moisture content) of 5.0% by weight, which was hardened by the general method described above.

The physicochemical properties of the inventive precipitated silica according to Example 1 are listed in Table 2 below.

Comparative Examples

Table 2 contains data regarding the physicochemical properties of prior art precipitated silicas. Comparative Example 1 corresponds to the starting silica for Example 1, Sipernat 2200® from Evonik Degussa GmbH, which is commercially available as a carrier silica. Comparative Example 2 is Tixosil 38 X® from Rhodia Chimie, and Comparative Example 3 is Hubersil 5170® from Huber.

TABLE 2

| Example | DBP (anhydrous) [g/(100 g)] | $d_{50}$ after 1 min of ultrasound at 25 watts [μm] | Proportion of particles <200 μm after 1 min of ultrasound at 25 watts [% by vol.] |
|---|---|---|---|
| Example 1 | 228 | 289.6 | 22 |
| Comparative Example 1 | 253 | 33.6 | 93 |
| Comparative Example 2 | 264 | 174.7 | 58 |
| Comparative Example 3 | 204 | 303 | 20 |

Table 2 shows that the precipitated silicas tested in Comparative Examples 1 and 2 have sufficient absorptivity but excessively high proportions of fine particles. The mean diameter $d_{50}$ after mechanical stress (simulated by the ultrasound input) is very much smaller than for the precipitated silica hardened in accordance with the invention. Analogously, the proportion of particles <200 μm is very much higher compared to the inventive precipitated silica, i.e. the comparative silicas lead to caking in the kneader and to increased dust formation in the course of production of absorbates. Comparative silica 3 is hard, but has the disadvantage that it has too low an absorptivity.

The effect of hardening becomes particularly clear on comparison of inventive Example 1 with Comparative Example 1. The unhardened precipitated silica of Comparative Example 1 has, after mechanical stress, a $d_{50}$ approx. 88% lower compared to Example 1. The proportion of particles <200 μm after mechanical stress on the unhardened precipitated silica of Comparative Example 1 is, in contrast, more than 4 times higher than in Example 1. This demonstrates that the inventive precipitated silicas are significantly harder than the carrier silicas typically used commercially to date.

The invention claimed is:

1. Precipitated silica comprising:
   a DBP absorption (anhydrous) of 210 to 270 g/100 g; and
   a $d_{50}$ of 230 to 600 μm;
   wherein the precipitated silica has sufficient hardness such that after a dispersion of the silica is exposed to 1 min of ultrasound mixing, the silica comprises a $d_{50}$ of 220 to 400 μm and a proportion of the silica smaller than 200 μm is less than 35% by volume.

2. Precipitated silica according to claim 1, wherein the precipitated silica has at least one of the following:
   a pH in the range from 5.5 to 9.5;
   sufficient hardness such that after a dispersion of the silica is exposed to 1 min of ultrasound mixing the silica comprises a $d_{50}$ of 270 to 360 μm;
   sufficient hardness such that after a dispersion of the silica is exposed to 1 min of ultrasound mixing the silica comprises a proportion of particles smaller than 200 μm of 1-30% by volume; and
   an approximately spherical particle shape.

3. Absorbate comprising at least one of the precipitated silicas according to claim 1.

4. Absorbate according to claim 3, wherein at least one substance selected from the group consisting of formic acid, propionic acid, lactic acid, phosphoric acid, choline chloride solution, vitamin E acetate and derivatives, plant extracts, melamine resins and paint additives is absorbed on the precipitated silica.

5. Method of producing an absorbate, comprising incorporating at least one of the precipitated silicas according to claim 1 in to the absorbate.

6. Absorbate according to claim 3, wherein tagetes extract is absorbed on the precipitated silica.

7. Absorbate according to claim 4, wherein at least one substance is absorbed on the precipitated silica in an amount between 5 ml/100 g of precipitated silica and 230 ml/100 g of precipitated silica.

* * * * *